United States Patent
Gnech et al.

(10) Patent No.: US 7,870,482 B2
(45) Date of Patent: Jan. 11, 2011

(54) WEB BROWSER EXTENSION FOR SIMPLIFIED UTILIZATION OF WEB SERVICES

(75) Inventors: Thomas Hermann Gnech, Ammerbuch (DE); Steffen Koenig, Heidelberg (DE); Oliver Petrik, Stuttgart (DE); Holger Johannes Scheller, Meckesheim (DE)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 12/362,746

(22) Filed: Jan. 30, 2009

(65) Prior Publication Data
US 2010/0199169 A1   Aug. 5, 2010

(51) Int. Cl.
*G06F 17/28* (2006.01)
(52) U.S. Cl. ............... 715/239; 715/234; 715/235; 715/236; 715/248; 715/249
(58) Field of Classification Search .......... 715/239, 715/234, 235, 236, 248, 249, 513, 500, 810; 707/609, 756, 760; 358/1.13; 719/320, 330; 370/328
See application file for complete search history.

(56) References Cited

U.S. PATENT DOCUMENTS

| | | | |
|---|---|---|---|
| 2002/0147745 A1* | 10/2002 | Houben et al. | 707/609 |
| 2005/0021754 A1* | 1/2005 | Alda et al. | 709/225 |
| 2005/0038708 A1 | 2/2005 | Wu | |
| 2005/0273692 A1* | 12/2005 | Horvitz et al. | 715/500 |
| 2006/0017947 A1* | 1/2006 | Wang et al. | 358/1.13 |
| 2006/0053368 A1* | 3/2006 | Bosworth et al. | 715/513 |
| 2006/0200499 A1* | 9/2006 | Bhatia et al. | 707/609 |
| 2007/0118844 A1* | 5/2007 | Huang et al. | 719/330 |
| 2007/0143434 A1 | 6/2007 | Daigle | |
| 2007/0214110 A1 | 9/2007 | Guertler et al. | |
| 2007/0214420 A1 | 9/2007 | Guertler et al. | |
| 2008/0172366 A1* | 7/2008 | Hannel et al. | 707/760 |
| 2008/0288889 A1* | 11/2008 | Hunt et al. | 715/810 |
| 2009/0018996 A1* | 1/2009 | Hunt et al. | 707/760 |
| 2009/0177685 A1* | 7/2009 | Ellis et al. | 707/756 |
| 2009/0232048 A1* | 9/2009 | Lynch et al. | 370/328 |
| 2009/0300656 A1* | 12/2009 | Bosworth et al. | 719/320 |

* cited by examiner

*Primary Examiner*—Le Luu
(74) *Attorney, Agent, or Firm*—Cantor Colburn LLP; Matthew Baca (57) ABSTRACT

A method of automatically consuming and processing web services includes parsing a first document describing a web service to identify a first set of attribute-value pairs describing a function offered by the web service and a second set of attribute-value pairs specifying instructions for processing result data returned by the function for rendering in a user interface element; constructing an invocation request object for invoking the first function based upon the first and second sets of attribute-value pairs; and processing the result data returned by the first function based upon the second set of attribute-value pairs to generate a set of code executable to render a presentation of the result data in the user interface element. The second set of attribute-value pairs includes a first attribute-value pair specifying a data type for the result data and a second attribute-value pair specifying a first instruction for processing the result data.

16 Claims, 5 Drawing Sheets

```
<webservice ws-location="http://myhost:8080/mywebapp/services/MyService?wsdl"
         ws-operation="getEmployeeList"
         ws-return-type="xml"
         ws-render-mode="table"
         ws-data-row="employee"
         ws-column-names="name, address, occupation"
         ws-column-headers="Name, Home Address, Job Description">

<ws-parameter name="departmentId" value="345">
</webservice>
```

| Name | Home Address | Job Description |
|---|---|---|
| Alan David Walden | 101 Southampton Row, London | Lawyer |
| Nicolas Isaac Halford | 51 Gloucester Terrace, London | Area Manager |

```
<object data="http://myhost:8080/mywebapp/services/MyService?wsdl"
    type="soa/xml" width="200" height="200">
    <param name="ws-operation" value= "getEmployeeList">
    <param name="departmentId" value="345">
    <param name="ws-return-type" value="xml">
    <param name="ws-render-mode" value="table">
    <param name="ws-data-row" value="employee">
    <param name="ws-column-names" value="name, address, occupation">
    <param name="ws-column-headers" value="Name, Home Address,
    Job Description">

Your Browser doesn't support this object type!
</object>
```

```
<table datasource="http://myhost:8080/mywebapp/services/MyService?wsdl"
            ws-operation="getEmployeeList"
            arguments="departmentId: 345"
            ws-data-row="employee"
            ws-return-type="xml">
   <tr>
     <th>Name</th>
     <th>Home Address</th>
     <th>Job Description</th>
   </tr>
   <tr>
     <td>name</td>
     <td>address</td>
     <td>occupation</td>
   </tr>
</table>

<img src="http://myhost:8080/mywebapp/services/MyService?wsdl"
            ws-operation="getSystemUtilizationGraph"
            arguments="clusterId:1123"/>
```

```
<object data="http://myhost:8080/mywebapp/services/MyService?wsdl"
    type="soa/xml" width="200" height="200">
    <param name="ws-operation" value= "getEmployeeList">
    <param name="departmentId" value="345">
    <param name="ws-render-mode" value="derived">

Your Browser doesn't support this object type!
</object>
```

WEB BROWSER EXTENSION FOR SIMPLIFIED UTILIZATION OF WEB SERVICES

BACKGROUND

Exemplary embodiments of the present invention relate to web services, and more particularly, to information mashups integrating data returned by multiple web pages.

Advances or changes in how enterprises conduct business continuously occur due to, for example, growing competition and globalization, mergers and acquisition, or business model revamping. Successful advances and changes often depend on how well an enterprise's information technology (IT) organization adapts to evolving needs. Because of the need to keep pace with the requirements imposed by this constant state of change, an increasing number of modern IT systems are implemented as aspects of Service Oriented Architectures (SOA) that rely on flexible building blocks in the form of "services" to expose their functionality. A service, such as a web service, may be implemented as a software application that may be called by another application to provide a service over a network, such as the Internet. A service represents a self-contained, self-describing piece of application functionality that can be found and called by other applications. A service may be self-contained because the application calling the service does not need to depend on anything other than the service itself, and may be self-describing because all the information on how to use the service can be obtained from the service itself. To interact with a service, a client system may make a call, such as a Simple Object Access Protocol (SOAP) call, to the service. The call may include sending a message, such as a SOAP message formatted in accordance with a WSDL (Web Services Definition Language) document describing the service.

The flexible infrastructure provided by SOA breaks applications down into component services and then enables these services to be joined together as composite applications that can be rapidly constructed to meet the needs of changing requirements. Because organizations are discovering the larger impact their information architectures have on the success of their SOA projects, an increasing number of SOA services are being implemented to provide retrieval of information as a service. SOA web services of this type can implemented to provide access to virtually all forms of information such as, for example, system states, monitoring data, and enterprise data in general. Such information retrieving services are known as information services.

To be utilized effectively, information in all forms and from all sources (including structured information residing in application databases, and unstructured information in e-mails, documents, specifications, and other sources) should be complete, accurate, and consistently available. Accordingly, the retrieved information that is returned from web service calls made to information services need to be provided in a meaningful context. To this end, information that is retrieved from multiple disparate information services can be integrated into a single view known as an "information mashup" in which the retrieved information is presented in the form of dynamically generated HyperText Markup Language (HTML) documents that can accessed via a web browser.

Presently, there are several technologies that can be employed to support the creation of information mashups that integrate the retrieved information returned from web service calls to information services such as Model-View-Controller (MVC) frameworks, portal frameworks, and other custom solutions implemented by developers. For example, one common technology utilized for implementing a web based information mashup involves the usage of a middle tier. A middle tier, usually an application server or some sort of portal server, receives the information request from a user, makes the necessary web service calls associated with the mashup, retrieves the output from these calls, and generates a composed view (HTML page) that is sent back to the user's web browser. More recently, with the advent of sophisticated third-party JavaScript libraries that support asynchronous, Extensible Markup Language (XML)-based data exchange from within a web page, a middle tier is not necessary. In particular, JavaScript libraries that support the consumption of web services directly out of a web page are used. To utilize the functionality of those JavaScript libraries, the developer of a mashup web page must write JavaScript code. Each of the present approaches employed to support the creation of information mashups, however, requires an extensive amount of manual code generation, error-prone custom coding, time-consuming infrastructure setup, and additional configuration implementation on both the server-side and the client-side.

SUMMARY

An exemplary embodiment of a method of automatically consuming and processing web services includes parsing a first document describing a deployed web service to identify a first set of attribute-value pairs describing a first function offered by the web service and a second set of attribute-value pairs specifying instructions for processing result data returned by the first function for rendering in a user interface element implemented by a web service client; constructing an invocation request object for invoking the first function based upon the first and second sets of attribute-value pairs; and processing the result data returned by the first function based upon the second set of attribute-value pairs to generate a set of code executable by the web service client to render a presentation of the result data returned by the first function in the user interface element. The second set of attribute-value pairs includes a first attribute-value pair specifying a data type for the result data returned by the first function and a second attribute-value pair specifying a first instruction for processing the result data returned by the first function.

Exemplary embodiments of the present invention that are related to computer program products and data processing systems corresponding to the above-summarized method are also described and claimed herein.

Additional features and advantages are realized through the techniques of the present invention. Other exemplary embodiments and aspects of the present invention are described in detail herein and are considered a part of the claimed invention. For a better understanding of the present invention with advantages and features, refer to the description and to the drawings.

BRIEF DESCRIPTION OF THE SEVERAL VIEWS OF THE DRAWINGS

The subject matter that is regarded as the present invention is particularly pointed out and distinctly claimed in the claims at the conclusion of the specification. The foregoing and other objects, features, and advantages of the various embodiments of the present invention are apparent from the following detailed description of exemplary embodiments taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the present invention. For instance, the steps may be performed in a differing order, or steps may be added, deleted, or modified. All of these variations are considered a part of the claimed invention.

DETAILED DESCRIPTION

While the specification concludes with claims defining the features of the present invention that are regarded as novel, exemplary will be better understood from a consideration of the detailed description in conjunction with the drawings. It is of course to be understood that the embodiments described herein are merely exemplary, which can be embodied in various forms. Therefore, specific structural and functional details disclosed herein in relation to the exemplary embodiments described herein are not to be interpreted as limiting, but merely as a representative basis for teaching one skilled in the art to variously employ embodiments in virtually any appropriate form, as well as any suitable modifications that may be made to these embodiments. Further, the terms and phrases used herein are not intended to be limiting but rather to provide an understandable description of the present invention. As used herein, the singular forms "a", "an", and "the" are intended to include the plural forms as well, unless the content clearly indicates otherwise. It will be further understood that the terms "comprises", "includes", and "comprising", when used in this specification, specify the presence of stated features, integers, steps, operations, elements, components, and/or groups thereof Generally, a "service" is any individual action or function, or combination of actions and functions that can provide functional behavior (for example, a callable method, an application, or a portion of an application, and the like). Generally, a web service is a single service or combination of services (or combination of services and existing web services) configured to be accessible using standard network communication protocols, such as Internet protocols. Web services combine the best aspects of component-based development and the web. Like components, web services represent black-box functionality that can be reused without worrying about how the service is implemented. Unlike current component technologies that are accessed via object-model-specific protocols, web services are accessed via ubiquitous web protocols and data formats, such as HyperText Transfer Protocol (HTTP) and Extensible Markup Language (XML). Furthermore, a web service interface is defined strictly in terms of the messages the web service accepts and generates. Consumers of the web service can be implemented on any platform in any programming language, as long as they can create and consume the messages defined for the web service interface.

Certain key specifications and technologies are generally employed for developing or consuming web services. These include specifications and technologies that address a standard way to represent data; a common, extensible, message format; a common, extensible, service description language; a way to discover services located on a particular web site; and a way to discover service providers. XML is currently the most common choice for providing a standard way to represent data. Most web service-related specifications use XML for data representation. The Simple Object Access Protocol (SOAP) defines one lightweight protocol for information exchange that can be employed, for example, to provide an envelope around the XML document. One aspect of the SOAP specification defines a set of rules for using XML to represent data. Other aspects of the SOAP specification define an extensible message format, conventions for representing remote procedure calls (RPCs) using the SOAP message format, and bindings to the HTTP protocol. SOAP messages can be exchanged over other protocols, but the current specification defines bindings for HTTP. A standard way to document what messages the web service accepts and generates (for example, to document a web service contract) is by using the Web Services Description Language (WSDL), which is an XML-based contract language that is widely supported by developer tools for creating web services. The Universal Description, Discovery, and Integration (UDDI) registry specifies a mechanism for web service providers to advertise the existence of their web services and for web service consumers to discover web services of interest. However, a UDDI registry is not a prerequisite for the implementation of an exemplary embodiment of the present invention.

Presently, most web services platforms communicate using HTTP or HTTPS with XML-based formats such as SOAP, WSDL, and UDDI. SOAP is used for remote invocation and is a protocol specification that defines uniform ways of passing XML-encoded data. SOAP also defines a way to perform remote procedure calls (RPCs) using HTTP as the underlying communication protocol. UDDI provides a directory service for web services in the form of a UDDI registry along with a mechanism for clients to dynamically find other web services. In practice, organizations that want to publish or advertise a service (and its usage interfaces) register or publish the service with the UDDI registry. The published information typically includes binding information that provides technical details necessary to invoke a web service, such as Uniform Resource Locators (URLs), information about method names, argument types, and the like. Clients that want to obtain web services of a certain kind use a UDDI interface or other device to query or find web services in the UDDI registry and receive back locator or identification information for a service along with call-in requirements for invoking the web service and/or binding an application to the web service. Communications with the UDDI registry are typically XML-formatted information enveloped in SOAP messages that are sent using HTTP headers. Services are advertised using WSDL, which provides a way for service providers to describe the basic format of web service requests over different protocols or encodings. WSDL advertisements include XML-formatted information describing what a web service can do, where it resides, and how to invoke it, and WSDL advertisements are a subset of a UDDI service description.

Figure 1:
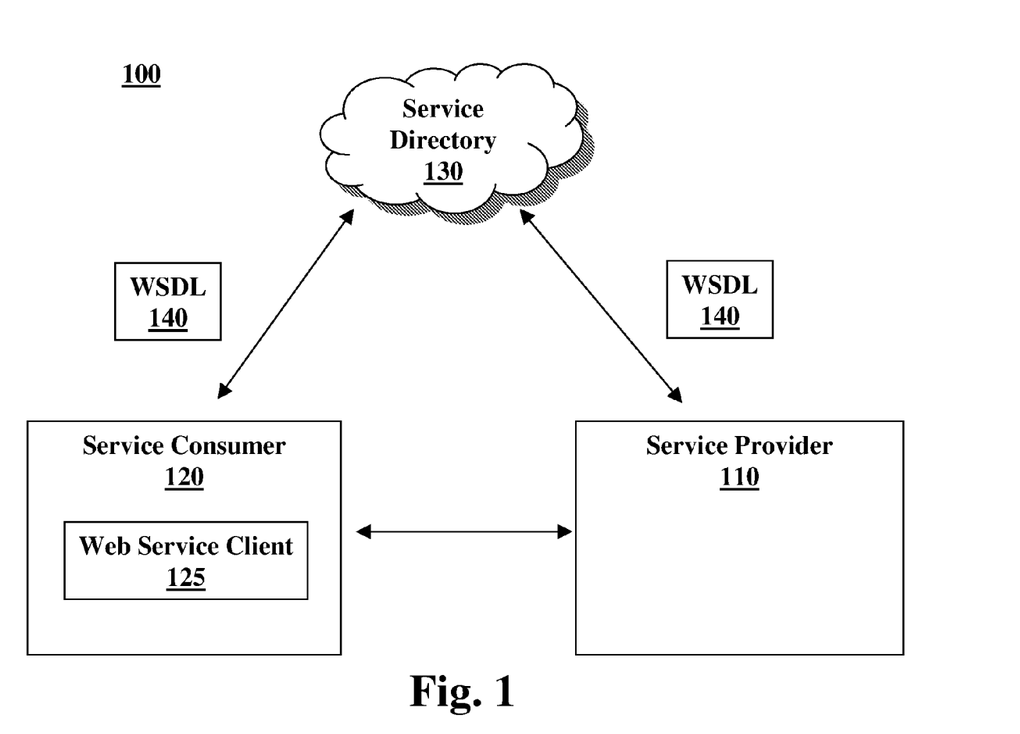
FIG. 1 is a block diagram illustrating the architecture of an exemplary web service framework in which exemplary embodiments of the present invention may be implemented and operate.

FIG. 1 is a block diagram illustrating the architecture of an exemplary web service framework 100 in which exemplary embodiments of the present invention may be implemented and operate. Web services framework 100 includes a service provider 110, a service consumer 120, and a service directory 130. Service provider 110 may be, for example, a web application server that is implemented according to any of the Java 2 Enterprise Edition specifications (hereinafter, the J2EE standard). One or more web services are deployed on service provider 110. These web services can comply, at least in part, with the basic web services standards including the XML standard and the SOAP protocol. Service provider 110 publishes one or more web services on service directory 130 via a WSDL document 140. WSDL document 140 is an XML document that provides pertinent information about a web service such as its name, the methods that can be called, the parameters for the methods, and a location for sending requests.

Service directory 130 is a registry and discovery service for web services. Service directory 130 may implement the UDDI specification, which defines a set of SOAP messages that are used to access XML-based data (for example, WSDL document 140) in a directory. The UDDI specification also defines a registry information model to structure the data stored in service directory 130 and to make it easier to search and navigate.

Service consumer 120 is a computing device that locates and uses a web service published in service directory 130. Service consumer 120 may be, for example, a web application server, a general-purpose computer, personal digital assistant, telephone, and the like. Service consumer 120 may implement the UDDI specification to find and retrieve WSDL document 140. A number of files and classes may be generated based on retrieved WSDL document 140 to create a deployable web service client package on service consumer 120. Service consumer 120 may generate a web service client 125 based on the deployed web service client package. Web service client 125 may then access the web service from service provider 110 via, for example, the Internet.

In exemplary embodiments, web service client 125 may include a user interface, such as a web browser (also referred to as a browser), to present content provided from the web service from service provider 110. A web browser (for example, Mozilla Firefox) is an application used to locate and present content, such as a web page. A web page (also referred to as a page) is a document generated for presentation by a browser. Often, a page is generated using code, such as a markup language such as the HyperText Markup Language (HTML).

Exemplary embodiments of the present invention can be implemented provide a standardized, self-contained, web browser-based mechanism for supporting the automatic declarative consumption and output processing of web services via HTML markup. Exemplary embodiments can be implemented to provide a web browser extension configured to automatically implement a set of preparatory operations that can replace the web service preparation that has heretofore been performed either manually by application developers, or programmatically by middle tier applications or client-based, third-party script libraries. As will be described in greater detail below, the preparatory operations implemented by the web browser extension can allow the web browser itself to automatically call a web service, process the information retrieved from this service, and render it directly to the page. Exemplary embodiments can thereby operate, for example, to ease the utilization of information services offered by, for example, a Service Oriented Architecture (SOA) and to build information mashups based on these services without the need of complex MVC frameworks, portal technology, and custom coding.

Exemplary embodiments of the present invention described herein can be implemented using one or more program modules and data storage units. As used herein, the term "modules", "program modules", "components", "systems", "tools", "utilities", and the like include routines, programs, objects, components, data structures, and instructions, or instructions sets, and so forth that perform particular tasks or implement particular abstract data types. As can be appreciated, the modules refer to computer-related entities that can be implemented as software, hardware, firmware and/or other suitable components that provide the described functionality, and which may be loaded into memory of a machine embodying an exemplary embodiment of the present invention. Aspects of the modules may be written in a variety of programming languages, such as C, C++, Java, etc. As used herein, the terms "data storage unit," "data store", "storage unit", and the like can refer to any suitable memory device that may be used for storing data, including manual files, machine readable files, and databases. The functionality provided by exemplary embodiments can be combined and/or further partitioned. The modules and/or storage units can all be implemented and run on the same computing system (for example, the exemplary computer system illustrated in FIG. 5 and described below) or they can be implemented and run on different computing systems. For example, one or modules can be implemented on a personal computer operated by a user while other modules can be implemented on a remote server and accessed via a network.

Figure 2:
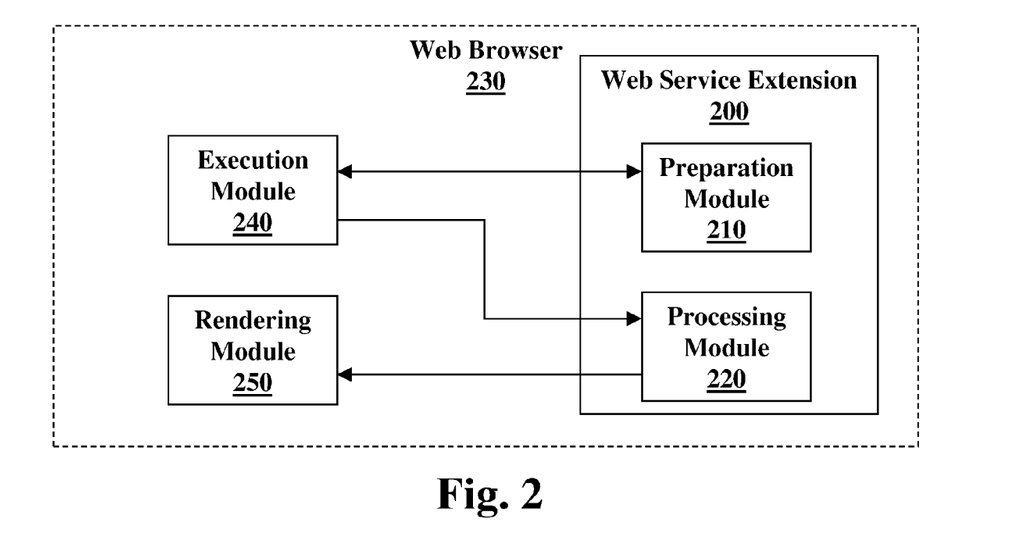
FIG. 2 is a block diagram illustrating an exemplary embodiment of a web browser extension for supporting the automatic declarative consumption and output processing of web services via HTML markup within a web browser tool or application.

Referring now to FIG. 2, a block diagram illustrating an exemplary embodiment of a web browser extension 200 for supporting the automatic declarative consumption and output processing of web services via HTML markup within a web browser tool or application is provided. As will be described, web browser extension 200 is configured to simplify the utilization and presentation of content provided from web services requested from one or more service providers by the web browser operating on a service consumer in a distributed computing system such as one implemented according to exemplary web service framework 100 described above with reference to FIG. 1. In exemplary embodiments, web browser extension 200 can be configured for incorporation within any suitable web browser tool or application as a plug-in, add-on, or extension. As used herein, the terms "plug-in", "add-on", or "extension", and the like can refer to a software application or module program, or one or more computer instructions, which may or may not be in communication with other software applications or modules, that interacts with a host application to provide specified functionality, and which may include any file, image, graphic, icon, audio, video, or any other attachment.

In the present exemplary embodiment, web browser extension 200 is incorporated within a web browser 230 and includes a preparation module 210 and a processing module 220. Generally, preparation module 210 is configured to receive WSDL descriptions for deployed web services and prepare web service invocations made by the web browser, while processing module 220 is configured to process the content provided by web services invoked by the web browser. Web browser 230 includes an execution module 240 and a rendering module 250. Execution module 240 is configured to send SOAP request messages containing invocation request objects to web services using the HTTP transport protocol, and to receive SOAP response messages from the web services containing the output from the web services using the HTTP transport protocol. Rendering module 250 is configured to render the presentation of the content processed by processing module 220 in the user interface implemented by the web browser.

The user interface implemented by web browser 230 provides a user interface element (for example, an address bar) that allows a user enters a unique Uniform Resource Locator (URL) that specifies where a web page is accessible and the mechanism for retrieving it (that is, the document's network location). Upon receiving such an input from the user, web browser 230 is configured to request and retrieve the web page from the specified network location and load the retrieved web page (which may be, for example, an HTML document) in, for example, a browser window provided by the web browser user interface. Upon retrieving the web page, web browser 230 is also configured to parse the markup language of the web page document to attempt to locate an embedded web service in the web page. Where such a reference is found, the markup can include a 'ws-location' attribute having a value that specifies the location of the WSDL document that describes the operations, input parameters, and output parameters of the deployed web service to be incorporated by the web browser in the user interface presentation of the web page rendered by rendering module 250. The location of the WSDL document may be specified using, for example, a unique Uniform Resource Locator (URL) that specifies where the identified WSDL document is accessible and the mechanism for retrieving it (that is, the document's network location).

Upon receiving identifying an embedded web service in the retrieved web page, web browser 230 retrieves and validates the identified WSDL document from the specified network location. The retrieved WSDL document is an XML document that describes one or more web services, one or more functions provided by each web service, zero or more input parameters accepted by each function, and the data each function returns as output. A WSDL document generally contains information for types, messages, port types, bindings, and services supported by a web service provider. From this WSDL document, a web service consumer or client such as a web browser may determine how to communicate with a web service and what functionality the web service provides. In particular, a WSDL document includes two main parts, interface and implementation. The interface part comprises of abstract descriptions of the port types, which list the abstract functions supported by the described web services, the bindings, which specify the appropriate data format and network transport protocol (for example, SOAP, HTTP, Simple Network Management Protocol (SNMP), etc.) for delivering the web service functions provided by each particular port type, and the SOAP schema types of the input and output parameters for the functions provided by the web services. The implementation part comprises one or more ports each having an endpoint, which specifies the network address at which the described web service resides (that is, the location of the web service that processes requests and/or provides responses). Each port points to a binding instance in the interface part.

Upon being retrieved and validated by web browser 230, the WSDL document is provided as the initial input to web browser extension 200. Upon web browser extension receiving the WSDL document, preparation module 210 is configured to automatically parse the XML content of the WSDL document and attempt to identify the endpoints and the port types. Preparation module 210 then constructs the SOAP request message that includes the invocation request object and input parameters for calling the identified web service. SOAP provides a mechanism to enable applications to access objects on virtually any platform without specific knowledge of the platform or the operating system where the accessed object resides. For each endpoint identified in the WSDL document, preparation module 210 automatically generates client stubs and constructs the invocation request object. For each port type identified, the system generates web-based forms for receiving input parameters from the end user.

With greater particularity, to construct the invocation request object from the identified content of the WSDL document, preparation module 210 generates the client stubs for the identified endpoints, loads the classes from the generated stubs, and constructs the invocation request object from the loaded classes. In exemplary embodiments, preparation module 210 can be configured to implement shortcuts to the construction of the invocation request object, provided that client stubs and/or the loaded classes preexist. These shortcuts can improve system performance by reducing resource intensive invocation request object construction. To construct invocation inputs, preparation module 210 parses the input form data to identify the parameter name/value pairs, maps the SOAP schema data types to those of underlying programming language (for example, the SOAP types can be mapped to types of other programming languages such as C, C++, Java and JavaScript), and adds the parameter name/value pairs to a parameter list. Where a SOAP type cannot be mapped to a basic type for the underlying programming language, preparation module 210 can be implemented to use preconfigured typemappers. Finally, the system introspects the generated client stubs and maps to the types defined in the generated stubs.

In the present exemplary embodiment, the web based forms and the client stubs are concurrently generated for performance reasons. The preparation module 210 generates client stubs and constructs the invocation request object in the background. Upon submission of the input form data and construction of the invocation request object (as further described below), the web browser can then invoke the designated web service, and the end user will not experience noticeable latency in SOAP response.

Web browser extension 200 is configured to support the embedding of web services in HTML documents by relying on metadata provided by extended and/or newly introduced HTML tags employed in retrieved HTML documents that include additional attributes for describing the web services associated with the extended and/or newly introduced HTML tags and formatting information for use by web browser 230 to embed the rendering of the results returned by these web services within a web page presented to the user through the user interface implemented by the web browser. This particular metadata can be included in the HTML documents during development of the web page (for example, using a text editor or any other suitable tool). Preparation module 210 is configured to identify occurrences of these additional attributes during parsing the content of the retrieved HTML document. Based on the identified occurrences of the additional attributes and their values in the HTML document, preparation module 210 is configured to employ these additional attributes by loading and parsing of the associated WSDL document (referred in ws-location), preparing the web service invocation request object.

In the present exemplary embodiment, the additional attributes for describing the associating web services include a 'ws-location' attribute that provides a string value specifying the location of the WSDL document for a deployed web service (for example, a URL), an 'ws-operation' attribute that provides a string value specifying the name of the particular function provided by the web service to be called, and a 'ws-parameter' attribute for specifying the name of each input parameter required by the web service function to be called (where one or more input parameters are required by the web service function). The additional attributes providing formatting information for use by a web browser to render the results describe how the presentation of the result data returned by the called web service function should be structured in the results web page provided via the user interface implemented within the web browser. In the present exemplary embodiment, these additional formatting attributes include a 'ws-return-type' attribute that provides the format or type of the data to be returned by the function specified by the value of the 'ws-operation' attribute (for example, XML, comma-separated values (CSV), JSON, HTML, text, etc.), and a 'ws-render-mode' attribute that provides a value defining how the data is to be rendered by the browser (for example, table, image, list, hyperlink, text etc.).

In exemplary embodiments, further additional formatting attributes specifying particular details of how the result data should be structured in the web browser presentation can also be provided based on the particular value specified for the 'ws-render-mode' attribute. For example, where the 'ws-render-mode' attribute is specified with a value of "table", the additional attributes providing formatting information can also include a 'ws-column-names' attribute providing a string array value that defines where the column data is found within the data returned by the web service operation specified by 'ws-operation' (for example, the value provided for the 'ws-column-names' attribute can specify particular XML tags or other metadata in the return data used for identifying the column data), a 'ws-column-headers' attribute providing a string array value that defines column header names for each column, and a 'ws-data-row' attribute that provides a string value that defines the start node of the data row for holding the row data found within the data returned by the web service operation specified by 'ws-operation' (for example, the value provided for the 'ws-data-row' attribute can specify a particular XML tag or other metadata in the return data used for identifying the row data). As another example, where the 'ws-render-mode' attribute is specified with a value of "image", no additional attributes providing formatting information need to be specified in the HTML tag for embedding the results returned by the web service within a web page. Rather, the returned image data can be embedded within the web page using an <img> tag that includes an 'src' attribute that specifying the location of the image, a 'ws-location' attribute specifying the location of the WSDL document for the web service, a 'ws-operation' attribute specifying the web service function to be called, and a 'ws-parameter' attribute specifying the parameters for the web service function to be called.

Figure 3A:
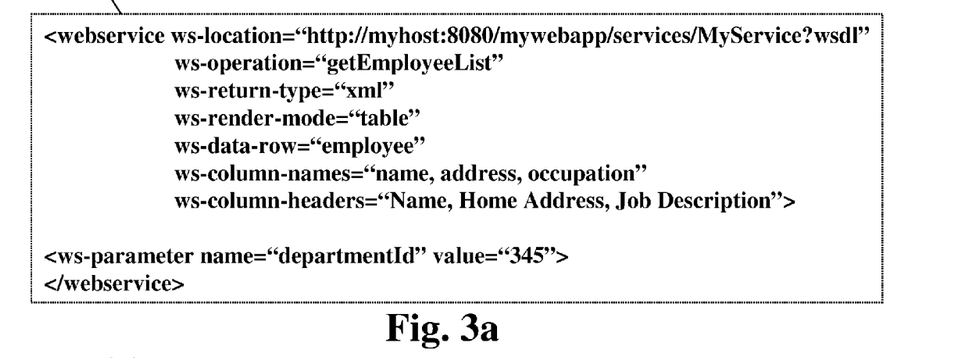
FIG. 3a is a sample code set for a newly introduced HTML tag for specifying a web service function associated with the tag and formatting information for use by a web browser to render the results returned by the web service in accordance with an exemplary embodiment of the present invention. Such a code set resides in an HTML document that is loaded by the web browser.

FIG. 3a provides an example of a sample code set utilizing a newly introduced HTML tag, '<webservice>' tag 300, to describe a web service function associated with the tag ("getEmployeeList" in this example) and formatting information for use by a web browser to render the results returned by the web service. In the present example, '<webservice>' tag 300 includes a 'ws-location' attribute having a value of "http://myhost:8080/mywebapp/services/MyService?wsdl", which is a URL describing the location of the WSDL document for the "getEmployeeList" in this example; a 'ws-operation' attribute having a value of "getEmployeeList", which is the web service being described in this example; a 'ws-return-type' tag having a value of "xml", which informs the web browser of the type of data returned by "getEmployeeList"; a 'ws-render-mode' attribute having a value of "table", which instructs a web browser that the data returned by the web service "getEmployeeList" should be rendered in a table format; a 'ws-data-row' attribute having a value of "employee", which informs the web browser of the tag holding the row information for the rendered table in the data returned by the web service "getEmployeeList"; a 'ws-column-names' attribute having a value of "name, address, occupation", which informs the web browser of the tags holding the column information for the rendered table in the data returned by the web service "getEmployeeList"; and a 'ws-column-headers' attribute having a value of "Name, Home Address, Job Description", which informs the web browser of the column header titles for the rendered table in the data returned by the web service "getEmployeeList". The '<webservice>' tag also specifies that the "getEmployeeList" web service receives an input parameter ('ws-parameter' attribute) "departmentId" and specifies a default value of "345" for the input value. In the exemplary embodiment of web service extension 200 described above with reference to FIG. 2, preparation module 210 can be configured to substitute the input values defined in the HTML tags for the parameters in the web service invocation request object.

Figure 3B:
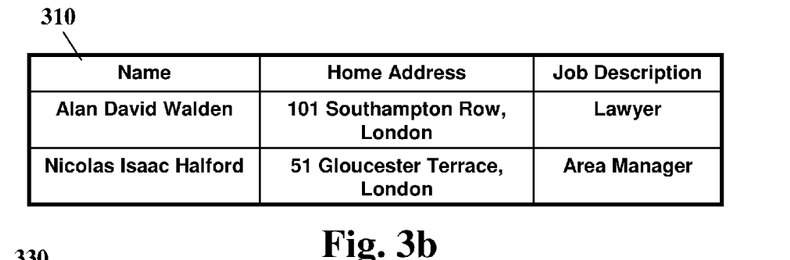
FIG. 3b illustrates an example output display that may be rendered within a web page by a web browser in a table format for the data returned by a web service having a web service description that includes the sample code set of FIGS. 3a, 3c, 3d, and 3e.

FIG. 3b provides an example output display 310 that may be rendered within a web page by a web browser for the data returned by "getEmployeeList" in a table format according to the attributes providing in the example '<webservice>' tag implementation describing the "getEmployeeList" web service. As depicted, the row of column headers includes for each of 'Name', 'Home Address', and 'Job Description' as specified by the 'ws-column-headers' attribute of the example '<webservice>' tag, each row following the row of column headers in the table corresponds to information on a particular employee as specified by the 'ws-data-row' attribute, and each column of the table include employee data corresponding to the column information specified by the 'ws-column-names' attribute.

Referring again to exemplary web service extension 200 illustrated in FIG. 2, as described above, preparation module 210 is configured to parse the HTML document to identify occurrences of 'ws-parameter' tags in the extended and/or newly introduced HTML tags that describe associated web services and provide formatting information for use by a web browser to render the results returned by these web services. Based on the values of the 'ws-parameter' tags preparation module 210 is configured to automatically propagate these values to the invocation request object. In exemplary embodiments, web browser extension 200 can be implemented to manipulate the web browser's Document Object Model (DOM) according to the markup representing the result data returned by each of one or more web services called by the web browser. In this manner, the DOM is updated with the information that is retrieved from multiple, disparate web services forming a single "information mashup" web page in which the retrieved information from the multiple sources is presented in a common context.

Figure 3C:
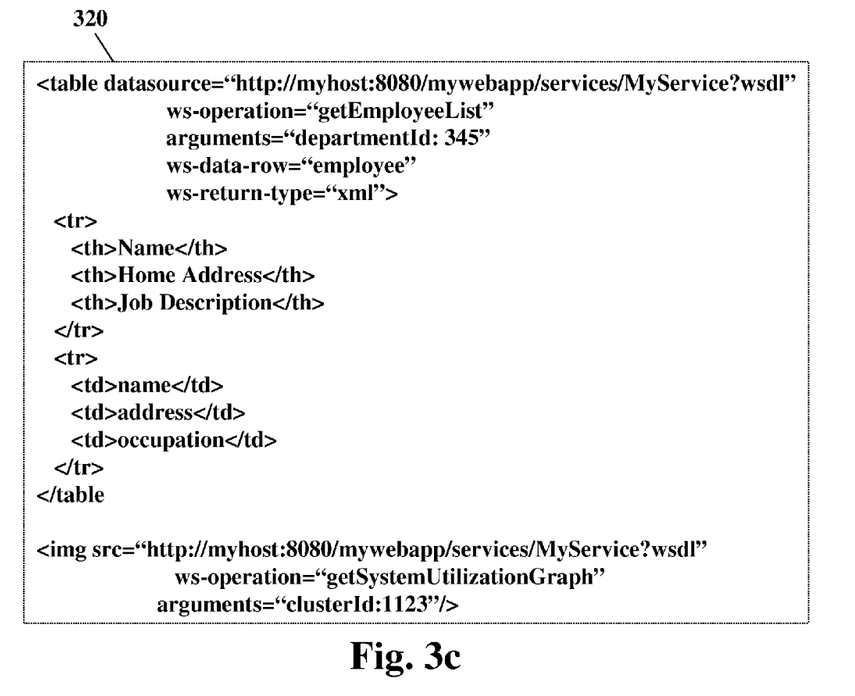
FIG. 3c is a sample code set for an extended HTML tag specifying a web service function associated with the tag and formatting information for use by a web browser to render the results returned by the web service in accordance with an exemplary embodiment of the present invention. Such a code set resides in an HTML document that is loaded by the web browser.
Figure 3D:
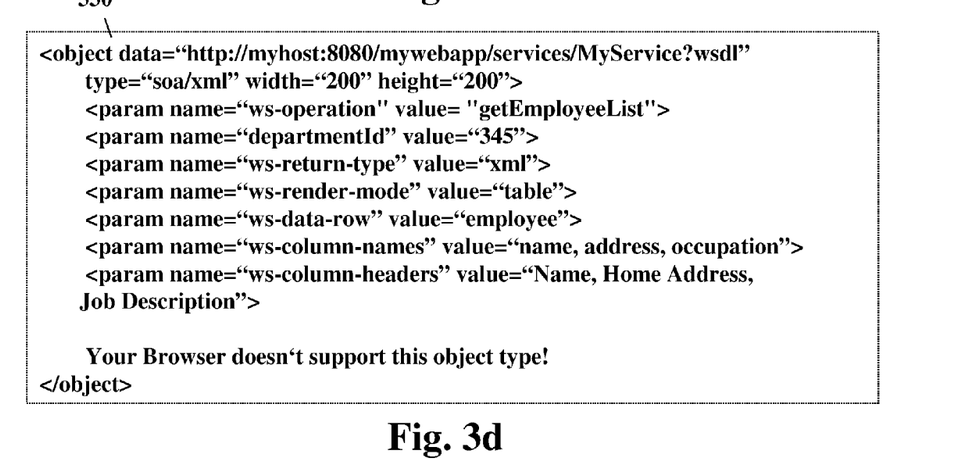
FIG. 3d is a sample code set for an extended HTML tag specifying a web service function associated with the tag and formatting information for use by a web browser to render the results returned by the web service in accordance with an exemplary embodiment of the present invention. Such a code set resides in an HTML document that is loaded by the web browser.

FIG. 3c provides an example of a sample HTML code set 320 for a HTML embedded web service. The invocation request object of the web service referred to in this sample may be automatically prepared by preparation module 210 in accordance with the example '<webservice>' tag of FIG. 3a used for describing the "getEmployeeList" web service function based on the information in the additional formatting attributes of the example '<webservice>' tag. Sample HTML code set 320 is implemented to be employed by the web browser calling the "getEmployeeList" web service function to render the returned results in the table format specified in the WSDL document for "getEmployeeList". As also depicted in FIG. 3c, sample HTML code set 320 additionally includes HTML code for integrating data returned from a "getSystemUtilizationGraph" web service function call into the web page representation that may be rendered by the web browser. Thus, the rendering of the DOM document that contains the example HTML code depicted in FIG. 3c will include both the data returned by the "getEmployeeList" web service function (to be presented in a table format) and the data returned by the "getSystemUtilizationGraph" web service function (to be presented in an image format). FIG. 3d provides an example of a sample HTML code set 330 for an enhanced HTML object tag embedding a web service. The invocation request object of the web service referred to in this sample may be automatically prepared by preparation module 210 for calling the "getEmployeeList" web service in accordance with the additional attributes and their values as specified in the HTML document. As shown, the example HTML object tag specifies the parameters and values of "getEmployeeList" from the 'ws-operation' attribute, "345" from the 'departmentId' input parameter to submit in the call to "getEmployeeList", "table" for 'ws-render-mode' attribute, "name, address, occupation" for the 'ws-column-names' attribute, and "Name, Home Address, Job Description" for the 'ws-column-headers' attribute, "employee'" for the 'ws-data-row' attribute, as well as a 'type' attribute having a value of "soa/xml".

Referring again to FIG. 2, in exemplary embodiments, preparation module 210 can be further configured to, where specified to do so by metadata provided by the extended and/or newly introduced HTML tags employed in a retrieved HTML document, automatically obtain the metadata to be used by the web browser to process, format, and render the data returned in web service output directly from the web service itself. For example, preparation module 210 can be notified that the processing, formatting, and rendering metadata should be obtained from the web service by a specified value of "derived" for a 'ws-render-mode' attribute included in the WSDL document. In such a case, the "derived" value in the 'ws-render-mode' attribute indicates that the web service is configured to include this information for structuring the web browser presentation of the data returned by the web service in the actual returned data, and the preparation module 210 can be configured to include parameter specifications for the output structuring information in the automatically constructed invocation request object.

Figure 3E:
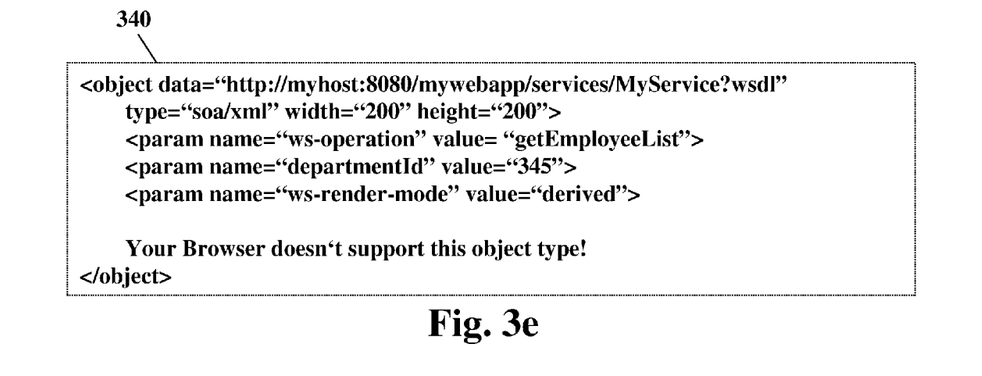
FIG. 3e is a sample code set for an extended HTML tag (render mode derived) specifying a web service function associated with the tag and formatting information for use by a web browser to render the results returned by the web service in accordance with an exemplary embodiment of the present invention. Such a code set resides in an HTML document that is loaded by the web browser.

FIG. 3e provides an example of a sample HTML code set 340 for a HTML embedded web service. The invocation request object of the web service referred to in this sample may be automatically prepared by preparation module 210 for calling a "getEmployeeList" web service function in accordance with the additional attributes and their values as specified in a HTML document having a specified value of "derived" for a 'ws-render-mode' attribute. As shown, the example invocation request object specifies the required parameters and values of "getEmployeeList" for 'ws-operation', "345" for 'departmentId', and "derived" for 'ws-render-mode'. As will be described below, in situations where the WSDL document for a web service to be invoked includes a specified value of "derived" for a 'ws-render-mode' attribute, processing module 220 can be configured to automatically construct the DOM representation for the web browser presentation of the data returned by the web service upon receiving the returned data.

In the present exemplary embodiment, upon construction of the invocation request object by preparation module 210 for a web service function to be invoked by the web browser, web browser extension 200 is configured to provide the automatically constructed invocation request object to execution module 240 of web browser 230, which can then execute the web service call by invoking the web service using the invocation request object in a suitable manner (for example, sending the invocation request object in a SOAP request message format to the web service using the HTTP transport protocol via a network such as the Internet or any other suitable communications mechanism) and retrieving a response message (for example, a SOAP response message sent from the web service using the HTTP transport protocol via a network) that contains the result data returned by the web service. To the called web service, the request message appears as a standard request despite being automatically constructed by preparation module 210 as described above. Upon retrieval of the returned result data by execution module 240, processing module 220 is configured to receive the web service output data from web browser 230. Processing module 220 is configured to process the returned data according to the description in the HTML document by extracting the result data values returned by the web service and inserting them into the DOM utilized by the web browser to render the web page according to the markup in the HTML page.

In situations where the HTML tag for a web service specifies a value of "derived" for a 'ws-render-mode' attribute, processing module 220 can be configured to automatically construct the DOM representation for the web browser presentation of the data returned by the web service upon receiving the returned data. A web service (enhanced) HTML tag having a specified value of "derived" for a 'ws-render-mode' attribute indicates that the web service described by this tag is configured to include metadata in the output data returned by the web service that provides the formatting information for use by a web browser to render the presentation of the data returned by the web service. Processing module 220 is configured to identify occurrences of these additional attributes by parsing the content of the returned data, and updating corresponding attributes in the DOM utilized by the web browser accordingly.

Upon the updating of the DOM by processing module 220, web browser 230 simply needs to access and modify its DOM that has been automatically constructed by web service extension 200 to render the presentation of the data returned by the web service in a web page. As described above, the DOM will be utilized by the web browser to integrate information that is retrieved from multiple, disparate information services into a single information mashup web page that can accessed via a web browser. In such a situation, the web page of integrated result data can appear to the user as, for example, multiple, separate areas or windows within a browser, with each separate area or window presenting the result data returned by one of the web services. Furthermore, by utilizing the same DOM that has been automatically prepared in this manner, the web browser is able to automatically inspect and dynamically update the result data returned by the web service by invoking the web service function in the same manner as before by executing the call using the same invocation request object as was automatically generated by preparation module 210 with the same set of input parameter values and providing the result data returned by the web service to processing module so that processing module 220 can update the DOM with the result data by extracting the result data values for the parameters returned by the web service and inserting these values in the corresponding DOM attributes.

Figure 4:
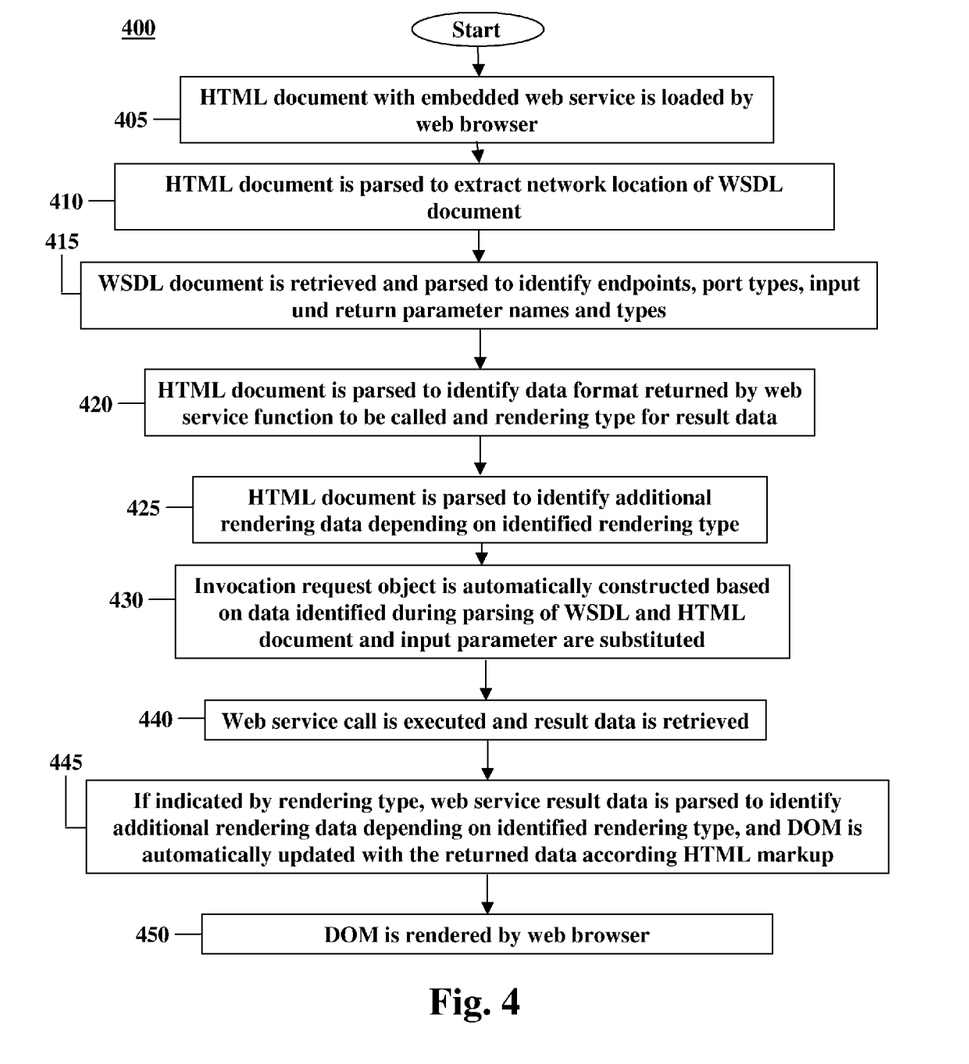
FIG. 4 is a flow diagram illustrating an exemplary embodiment of a process of providing for the automatic declarative consumption and output processing of a web service within a web browser.

Referring now to FIG. 4, a flow chart illustrating an exemplary embodiment of a process 400 of providing for the automatic declarative consumption and output processing of a web service within a web browser. As will be described, exemplary process 400 can be implemented to allow the web browser itself to automatically call a web service, process the information returned from this service, and render it directly within a web page.

Beginning at block 405, an HTML document with the desired web service reference embedded therein is loaded by the web browser. The HTML document is then parsed in order to extract the network location for the web service description (WSDL) document corresponding to the desired web service, as shown at block 410. In block 415, the WSDL document is retrieved from the specified network location and then parsed in order to identify the endpoints, port types, input and return parameter names and types specified in the web service description.

At block 420, the content of the HTML document is automatically parsed to attempt to identify a formatting attribute that specifies the format or type of the data to be returned by the particular web service function to be called (for example, XML, comma-separated values (CSV), JSON, HTML, text, etc.) and a formatting attribute that specifies a value defining how the data returned by the particular web service function should be rendered by the web browser (for example, table, image, list, URL, text etc.). At block 425, depending on the identified value specified by the formatting attribute that defines how the data returned by the web service function to be invoked should be rendered by the web browser, the content of the HTML document is automatically parsed to attempt to identify one or more additional formatting attributes specifying values providing particular details of how the result data should be structured in the rendering provided by the web browser. For example, where the formatting attribute that defines how the data returned by the HTML document to be invoked should be rendered by the web browser is specified with a value of "table", the additional attributes identified at block 425 can include an attribute providing a string array value that defines where the column data is found within the data returned by the web service to be invoked, an attribute providing a string array value that defines column header names to use in the table rendering for each column, and an attribute that provides a string value that defines the start node of the data row for holding the row data included within the data returned by the web service function to be invoked.

Referring next to block 430, an invocation request object is constructed for calling the identified web service, based on the parsing of both the WSDL and HTML document described above. More particularly, using the web service description at block 415, client stubs are automatically generated, the classes from the generated stubs are loaded, and the invocation request object is constructed from the loaded classes. The invocation request object is also automatically constructed at block 430 to include the string value specifying the location of the web service description for the web service to be invoked, the string value provided for the attribute used to specify the name of the particular function provided by the web service to be called, and the string value provided for each attribute used to specify the name of an input parameter required by the web service function to be called (where one or more such parameters are required by the web service function).

At block 440, the web service call is executed by propagating all values of the input parameters that were specified in the HTML document and invoking the web service using the invocation request object that was automatically generated at block 430 in a suitable manner and retrieving a response message from the web service that contains the result data returned by the web service.

At block 445, it is determined whether the identified formatting attribute in the web service description that specifies a value defining how the data returned by the particular web service function invoked should be rendered by the web browser does indicate that the metadata to be used by the web browser to process, format, and render the data returned in the web service result is to be obtained directly from the web service itself. Then, depending on the identified value specified this particular formatting attribute in the web service description, the content of the result data returned is automatically parsed to attempt to identify one or more additional formatting attributes specifying values providing particular details of how the result data should be structured in the rendering provided by the web browser. The internal DOM that is utilized by the web browser in rendering the presentation of the data returned by the web service function called is updated with the returned data according to the HTML markup.

At block 450, the DOM representation that has been updated with the data returned by the web service call is accessed and processed by the web browser to render the presentation of the data returned by the web service in a web page.

Exemplary embodiments as described herein can be implemented to provide a standardized, self-contained, web browser-based mechanism for supporting the automatic declarative consumption and output processing of web services via HTML markup. Exemplary embodiments can thereby be employed by a web browser to integrate the result data returned by multiple web services in a simple, logical manner within a single web page that requires only that minimal additional markup coding to be written during development (the additional coding being the inclusion of the extended and/or newly introduced HTML tags that include additional attributes for describing the web services associated with the extended and/or newly introduced HTML tags and formatting information for use by web browser to embed the rendering of the results returned by these web services as described above). This is because exemplary embodiments can be implemented to provide a web browser extension configured to understand and utilize this additional markup coding to automatically implement a set of preparatory operations that allow the web browser itself to automatically call web services, process the result data returned from these web services, and render the data directly to a web page providing an integrated representation of the data returned from each of the web services that can be dynamically updated. Exemplary embodiments can thereby be implemented to support the construction of an information mashup within a web page provided by a web browser without relying on server-side and client-side coding to consume, process, and present the result data returned by the web services, the additional implementation, configuration, and maintenance cost of middle-tier software, the executing of complex, interactive script code within a web browser context, or the utilization of third-party scripting libraries.

Exemplary embodiments can be implemented within a Service Oriented Architecture (SOA) to provide an information mashup that operates to provide an integrated, unified view of disparate data provided by information services offered within the SOA through a web browser that operates to ease the utilization of these information services without the need of complex MVC frameworks, portal technology, or custom coding. Information mashups can provide a key component for integrating business and data services, as mashup technologies provide the ability to develop new integrated services quickly, to combine internal services with external or personalized information, and to make these services tangible to the business user through a unified user interface. The information provided by the services offered within the SOA can include business and enterprise data provided by independent IT information and management systems such as, for example, failure tracking and reporting services, real-time system monitoring, data from a user request database, etc. Exemplary embodiments can be implemented to present such disparate data in a unified context by integrating providing a mechanism for implementing it within a single page or view accessible via a web browser.

In the preceding description, for purposes of explanation, numerous specific details are set forth in order to provide a thorough understanding of the described exemplary embodiments. Nevertheless, one skilled in the art will appreciate that many other embodiments may be practiced without these specific details and structural, logical, and electrical changes may be made.

Some portions of the exemplary embodiments described above are presented in terms of algorithms and symbolic representations of operations on data bits within a processor-based system. The operations are those requiring physical manipulations of physical quantities. These quantities may take the form of electrical, magnetic, optical, or other physical signals capable of being stored, transferred, combined, compared, and otherwise manipulated, and are referred to, principally for reasons of common usage, as bits, values, elements, symbols, characters, terms, numbers, or the like. Nevertheless, it should be noted that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

Exemplary embodiments of the present invention can be realized in hardware, software, or a combination of hardware and software. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following (a) conversion to another language, code or, notation; and (b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface including a wired network or a wireless network that allow a computer system to read such computer readable information.

Figure 5:
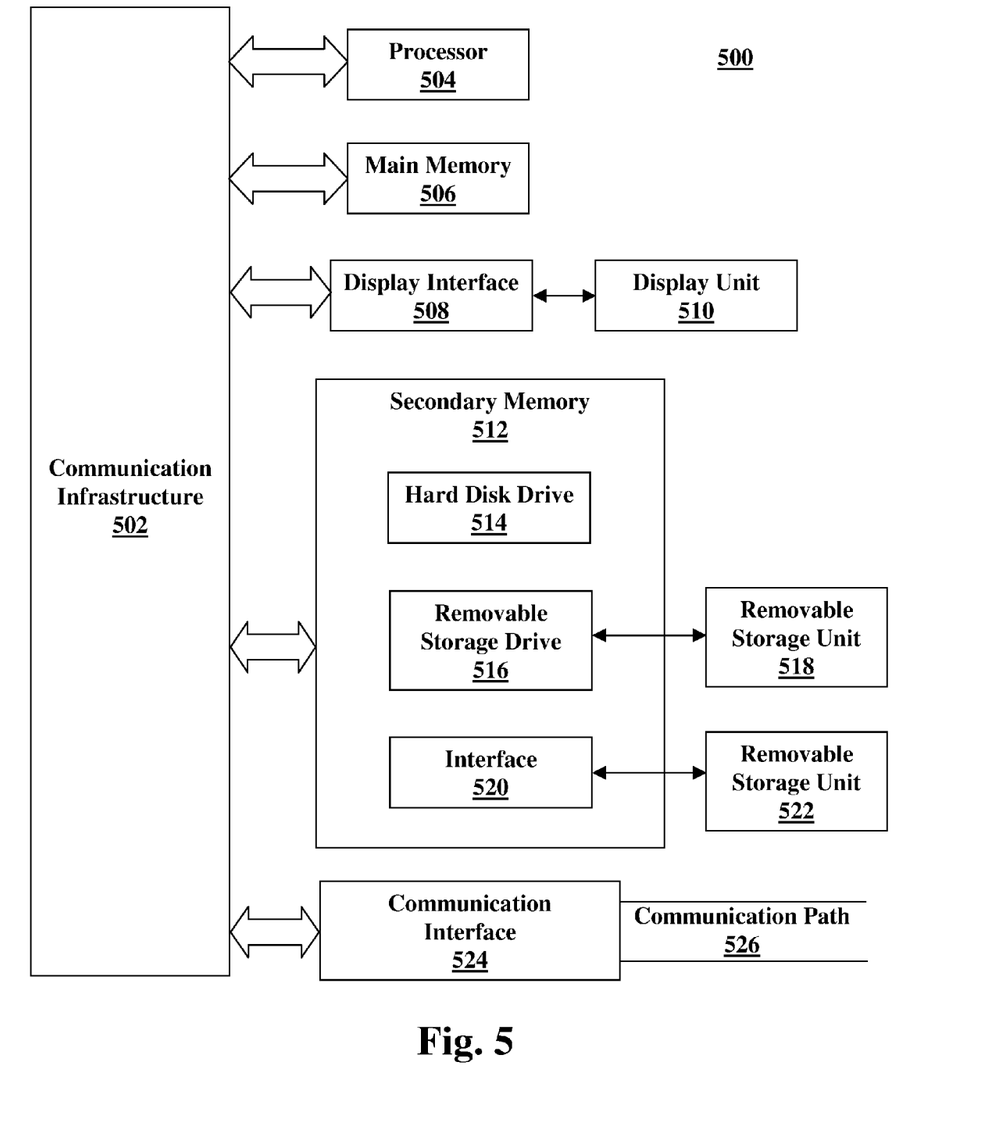
FIG. 5 is a block diagram illustrating an exemplary computer system that can be used for implementing exemplary embodiments of the present invention.

FIG. 5 is a block diagram of an exemplary computer system 500 that can be used for implementing exemplary embodiments of the present invention. Computer system 500 includes one or more processors, such as processor 504. Processor 504 is connected to a communication infrastructure 502 (for example, a communications bus, cross-over bar, or network). Various software embodiments are described in terms of this exemplary computer system. After reading this description, it will become apparent to a person of ordinary skill in the relevant art(s) how to implement exemplary embodiments using other computer systems and/or computer architectures.

Exemplary computer system 500 can include a display interface 508 that forwards graphics, text, and other data from the communication infrastructure 502 (or from a frame buffer not shown) for display on a display unit 510. Computer system 500 also includes a main memory 506, which can be random access memory (RAM), and may also include a secondary memory 512. Secondary memory 512 may include, for example, a hard disk drive 514 and/or a removable storage drive 516, representing a floppy disk drive, a magnetic tape drive, an optical disk drive, etc. Removable storage drive 516 reads from and/or writes to a removable storage unit 518 in a manner well known to those having ordinary skill in the art. Removable storage unit 518, represents, for example, a floppy disk, magnetic tape, optical disk, etc. which is read by and written to by removable storage drive 516. As will be appreciated, removable storage unit 518 includes a computer usable storage medium having stored therein computer software and/or data.

In exemplary embodiments, secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, a PCMCIA slot and card, etc. Software and data transferred via communications interface 524 are in the form of signals which may be, for example, electronic, electromagnetic, optical, or other signals capable of being received by communications interface 524. These signals are provided to communications interface 524 via a communications path (that is, channel) 526. Channel 526 carries signals and may be implemented using wire or cable, fiber optics, a phone line, a cellular phone link, a wireless LAN, an RF link, and/or other communications channels.

In this document, the terms "computer program medium," "computer usable medium," and "computer readable medium" are used to generally refer to media such as main memory 506 and secondary memory 512, removable storage drive 516, a hard disk installed in hard disk drive 514, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface including a wired network or a wireless network that allow a computer to read such computer readable information.

Computer programs (also called computer control logic) are stored in main memory 506 and/or secondary memory 512. Computer programs may also be received via communications interface 524. Such computer programs, when executed, can enable the computer system to perform the features of exemplary embodiments of the present invention as discussed herein. In particular, the computer programs, when executed, enable processor 504 to perform the features of computer system 500. Accordingly, such computer programs represent controllers of the computer system.

Although exemplary embodiments of the present invention have been described in detail, the disclosure is not intended to be exhaustive or limited to the described embodiments. It should be understood that various changes, substitutions and alterations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

The exemplary embodiments presented herein were chosen and described to best explain the principles of the various embodiments of the present invention and the practical application, and to enable others of ordinary skill in the art to understand the invention. It will be understood that those skilled in the art, both now and in the future, may make various modifications to the exemplary embodiments described herein without departing from the spirit and the scope of the present invention as set forth in the following claims. These following claims should be construed to maintain the proper protection for the various embodiments of the present invention.

The invention claimed is:

1. A method of automatically consuming and processing web services, the method comprising:

parsing a first document describing a deployed web service by a processor to identify a first set of attribute-value pairs describing a first function offered by the web service and a second set of attribute-value pairs specifying instructions for processing result data returned by the first function for rendering in a user interface element implemented by a web service client, the second set of attribute-value pairs including a first attribute-value pair specifying a data type for the result data returned by the first function and a second attribute-value pair specifying a first instruction for processing the result data returned by the first function;

constructing an invocation request object for invoking the first function based upon the first and second sets of attribute-value pairs; and processing the result data returned by the first function based upon the second set of attribute-value pairs to generate a set of code executable by the web service client to render a presentation of the result data returned by the first function in the user interface element.

2. The method of claim 1, wherein the first instruction for processing the result data returned by the first function specified by the second attribute-value pair specifies a rendering format for the result data returned by the first function, and wherein the second set of attribute-value pairs further includes zero or more attribute-value pairs specifying details for rendering the result data returned by the first function based upon the rendering format.

3. The method of claim 2, wherein the rendering format specified by the first instruction is selected from table, image, list, hyperlink, and text format.

4. The method of claim 3, wherein the rendering format specified by the first instruction is a table format, and wherein the zero or more attribute-value pairs specifying details for rendering the result data returned by the first function based upon the rendering format include a third attribute-value pair specifying where column data is located within the result data returned by the first function, a fourth attribute-value pair specifying the column header names to be used to render the result data, and a fifth attribute-value pair specifying where row data is located within the result data returned by the first function.

5. The method of claim 1, wherein the first instruction for processing the result data returned by the first function specified by the second attribute-value pair specifies that a data type of the result data returned by the first function is included in the result data returned by the first function, and further comprising processing the result data returned by the first function to identify a third attribute-value pair specifying a rendering format for the result data returned by the first function and zero or more attribute-value pairs specifying details for rendering the result data returned by the first function based upon the rendering format.

6. The method of claim 5, wherein processing the result data returned by the first function to generate a set of code executable by the web service client to render a presentation of the result data returned by the first function in the user interface element is further based upon the third attribute-value pair specifying a rendering format for the result data returned by the first function and the zero or more attribute-value pairs specifying details for rendering the result data returned by the first function based upon the rendering format.

7. The method of claim 1, wherein the data type for the result data returned by the first function specified by the first attribute-value pair is selected from XML, comma-separated values, JSON, HTML, and text.

8. The method of claim 7, wherein the web service client is a web browser, wherein the user interface element is a web page, and wherein the set of code executable by the web service client to render a presentation of the result data returned by the first function is written in HTML.

9. The method of claim 8, further comprising providing the invocation request object to the web browser for the web browser to use in invoking the first function, and receiving the result data returned by the first function upon the result data being retrieved by the web browser.

10. The method of claim 8, further comprising adding the set of code executable by the web service client to render the presentation of the result data returned by the first function to a Document Object Model (DOM).

11. The method of claim 10, further comprising executing the set of code to render the presentation of the result data returned by the first function in the web page.

12. The method of claim 10, wherein the DOM document includes a respective set of code for rendering a separate presentation for the result data returned by each of a plurality of web service functions, wherein the first function and each of the plurality of web service functions are provided by information services, and wherein the DOM document is executable by the web service client to render an information mashup of the presentation of the result data returned by the first function and the separate presentation for the result data returned by each of the plurality of web service functions in the web page.

13. The method of claim 12, wherein each of the plurality of web services is implemented within a distributed system having a Service-Oriented Architecture.

14. The method of claim 1, wherein processing the result data returned by the first function to generate the set of code executable by the web service client to render the presentation of the result data returned by the first function is further based upon the first set of attribute-value pairs such that the set of code includes a set of information accessible by the web service client to perform periodic invocations of the first function and dynamically update the set of code based upon the result data returned by the first function for each periodic invocation of the first function.

15. A non-transitory computer-usable medium having computer readable instructions stored thereon for execution by a processor to perform a method of automatically consuming and processing web services, the method comprising:

parsing a first document describing a deployed web service by a processor to identify a first set of attribute-value pairs describing a first function offered by the web service and a second set of attribute-value pairs specifying instructions for processing result data returned by the first function for rendering in a user interface element implemented by a web service client, the second set of attribute-value pairs including a first attribute-value pair specifying a data type for the result data returned by the first function and a second attribute-value pair specifying a first instruction for processing the result data returned by the first function;

constructing an invocation request object for invoking the first function based upon the first and second sets of attribute-value pairs; and processing the result data returned by the first function based upon the second set of attribute-value pairs to generate a set of code executable by the web service client to render a presentation of the result data returned by the first function in the user interface element.

16. A data processing system comprising:

at least one processor;

a random access memory for storing data and programs for execution by the at least one processor; and computer readable instructions stored in the random access memory for execution by the at least one processor to perform a method of automatically consuming and processing web services, the method comprising:

parsing a first document describing a deployed web service to identify a first set of attribute-value pairs describing a first function offered by the web service and a second set of attribute-value pairs specifying instructions for processing result data returned by the first function for rendering in a user interface element implemented by a web service client, the second set of attribute-value pairs including a first attribute-value pair specifying a data type for the result data returned by the first function and a second attribute-value pair specifying a first instruction for processing the result data returned by the first function;

constructing an invocation request object for invoking the first function based upon the first and second sets of attribute-value pairs; and processing the result data returned by the first function based upon the second set of attribute-value pairs to generate a set of code executable by the web service client to render a presentation of the result data returned by the first function in the user interface element.

* * * * *